United States Patent [19]

Hlavinka

[11] 4,239,625
[45] Dec. 16, 1980

[54] POTTING PLEATED MEMBRANE

[75] Inventor: Dennis J. Hlavinka, Lakewood, Colo.

[73] Assignee: Cobe Laboratories, Inc., Lakewood, Colo.

[21] Appl. No.: 33,205

[22] Filed: Apr. 25, 1979

Related U.S. Application Data

[63] Continuation of Ser. No. 810,956, Jun. 29, 1977, abandoned.

[51] Int. Cl.³ ............................................ B01D 31/00
[52] U.S. Cl. ............................ 210/321.3; 210/493.2; 264/257
[58] Field of Search ............ 210/493 M, 321 B, 22 A, 210/445; 422/48; 55/16, 158; 264/257, 258; 156/204, 205

[56] References Cited

U.S. PATENT DOCUMENTS

| 3,788,482 | 1/1974 | Markley | 210/493 M X |
| 3,864,265 | 2/1975 | Markley | 210/493 M X |
| 4,028,252 | 6/1977 | Morris | 210/493 M X |
| 4,116,841 | 9/1978 | Borsahyl | 210/493 M X |

*Primary Examiner*—Frank A. Spear, Jr.

[57] ABSTRACT

The tips of a pleated membrane are bonded to the interior of the housing of a fluid flow transfer apparatus by positioning support spacers in the membrane folds on the membrane side opposite the side to be bonded, closing the entrances to the spaces between the folds on the bonding side of the membrane, introducing flowable adhesive between the membrane tips and the housing interior while the entrances remain closed, applying a pressure differential across the membrane, with the higher pressure being on the bonding side of the membrane and the differential being large enough to force the membrane folds against their respective support spacers so that the spacers support the membrane, and curing the adhesive to harden it.

28 Claims, 6 Drawing Figures

POTTING PLEATED MEMBRANE

This is a continuation of application Ser. No. 810,956, filed on June 29, 1977, now abandoned.

FIELD OF THE INVENTION

This invention relates to fluid flow transfer devices using pleated membranes.

BACKGROUND OF THE INVENTION

In constructing a fluid flow transfer device using a pleated membrane such as a hemodialyzer, it is desirable to anchor the membrane tips on the blood (or other fluid to be dialyzed) side to the apparatus housing interior to direct the blood flow into the spaces between the membrane folds and prevent shunting of blood from inlet to outlet without being dialyzed between the folds. One problem has been development of a simple but effective method of anchoring the tips. One proposed method of anchoring the membrane tips is that invented by Thomas E. Goyne and involves injecting liquid adhesive potting material into a housing that is positioned horizontally, as are the membrane tips, to produce uniformity of potting.

Even with uniform potting, however, the problem of achieving a bond that will not fail has persisted, including in the situation in which the pleated membrane is treated with a plasticizer such as glycerin. One basis for the problem is that in normal operation a dialyzer will have a higher pressure on the blood side of the membrane, a pressure that will tend to force the membrane away from the potting. One way of strengthening the bond is by increasing the membrane tip surface area embedded in the potting. However, if one simply allows the potting to flow freely to cover more of the tip surface area, the potting may flow too far into the spaces between the membrane folds and block the fluid flow passages therein, thus impairing the efficiency of the device.

SUMMARY OF THE INVENTION

I have discovered that a strong bond between the housing interior and the pleated membrane tips of a fluid flow transfer device can be produced without undesirably interfering with fluid flow passages by carrying out the following steps: positioning support spacers in the membrane folds on the membrane side opposite the side to be bonded, closing the entrances to the spaces between the folds on the bonding side of the membrane, introducing flowable adhesive between the membrane tips and the housing interior while the entrances remain closed, applying a pressure differential across the membrane, with the higher pressure being on the bonding side of the membrane and the differential being large enough to force the membrane folds against their respective support spacers so that the spacers support the membrane, and curing the adhesive to harden it.

The bond produced is a strong one, including in the case in which the membrane has been treated with a plasticizer.

In particular aspects the invention includes applying positive pressure to the membrane side opposite the side to be bonded to close the entrances to the spaces between the folds, partially curing the adhesive for a time long enough to make it more viscous but not long enough to render it unable to flow, and applying negative pressure to the membrane side opposite the side to be bonded to produce the pressure differential and draw adjacent membrane folds away from each other, thereby reopening the entrances to permit the adhesive to flow partly into the spaces. The partial curing step is done long enough to prevent adhesive from flowing into and thus undesirably blocking fluid flow passages between membrane folds but not too long to prevent sufficient flow of adhesive into the spaces to increase the bonding surface of the tips. The tendency of the membrane folds to pull away from the potting under transmembrane pressure (higher on the blood side) is resisted by both the increased bonding area of the membrane and the support provided by the support spacers.

PREFERRED EMBODIMENT

I turn now to description of the presently preferred embodiment of the invention.

Drawings

DESCRIPTION

Figure 1:
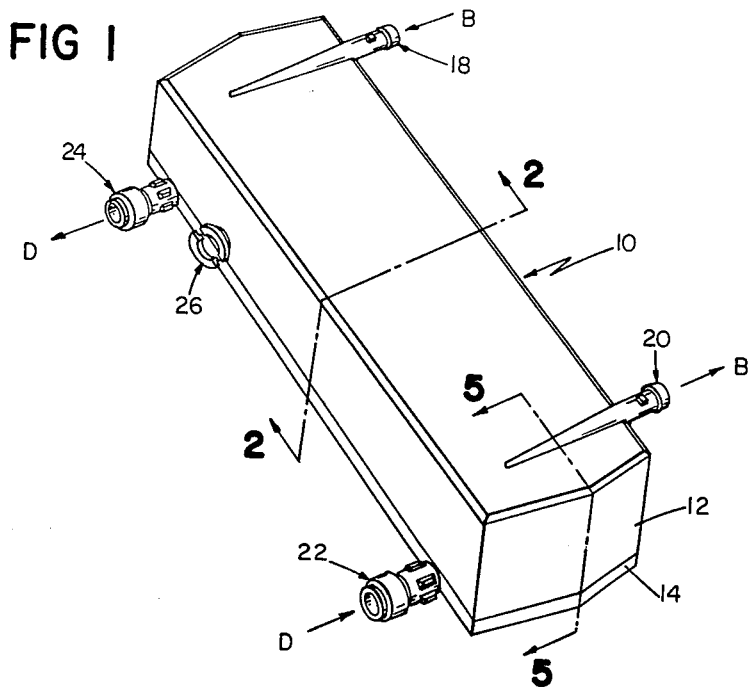
FIG. 1 is a perspective view of a dialyzer utilizing the presently preferred embodiment.

The embodiment shown in the drawings and its operation are now described.

1. Embodiment

Figure 2:
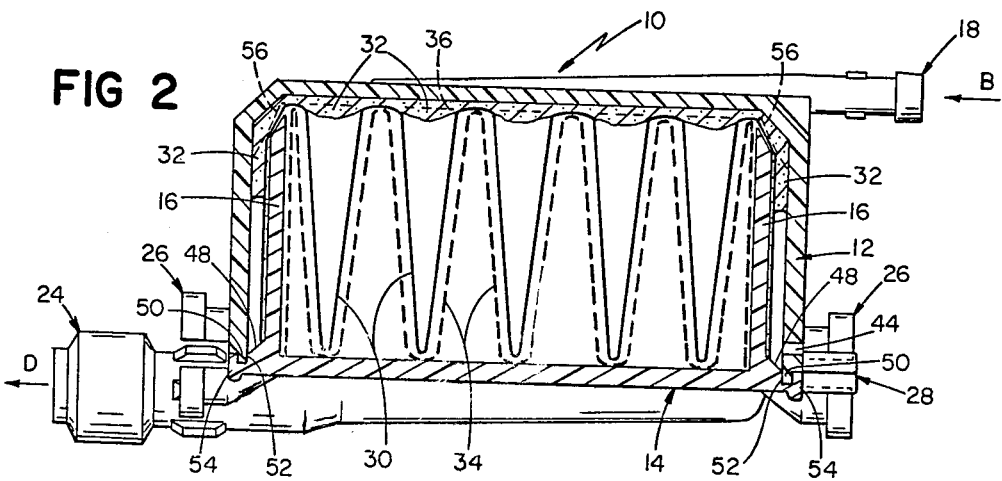
FIG. 2 is a somewhat diagrammatic sectional view along 2—2 of FIG. 1.

FIGS. 1 and 2 show dialyzer 10, which includes a two-part housing comprising trough-shaped polycarbonate casing 12 and interfitting polycarbonate casing 14, which is open at both longitudinal ends and has a pair of longitudinal fins 16. Casing 12 includes inlet 18 and outlet 20, both integrally molded therewith. Casing 14 includes integrally molded inlet 22 and outlet 24. Inlets 18 and 22 and outlets 20 and 24 become channels of steadily decreasing cross section when they enter their respective casings. A pair of stub shafts 26, formed by mating semicircular portions on casings 12 and 14, and a pair of cooperating stops 28 (only one is shown in FIG. 2), spaced equidistantly longitudinally from the right stub shaft, permit rotatable, vertical mounting of the dialyzer on a bracket, for degassing and normal operation.

Figure 3:
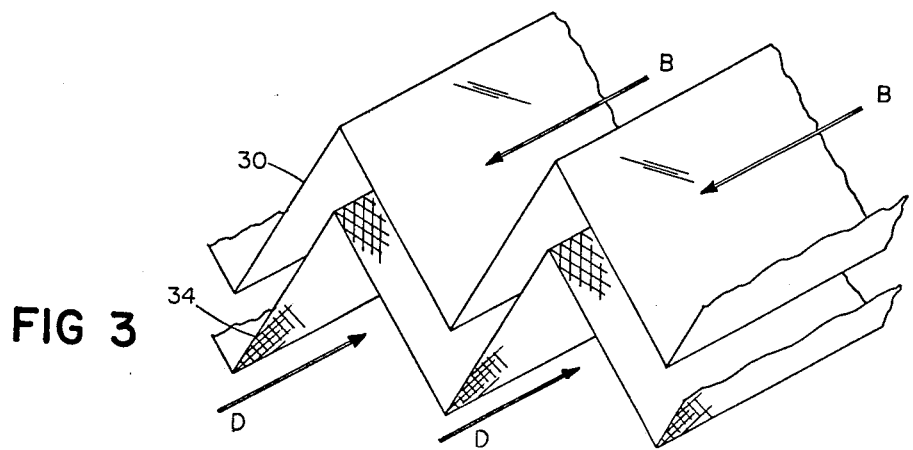
FIG. 3 is an exploded view of a portion of the membrane and support netting of the dialyzer of FIG. 1.
Figure 4:
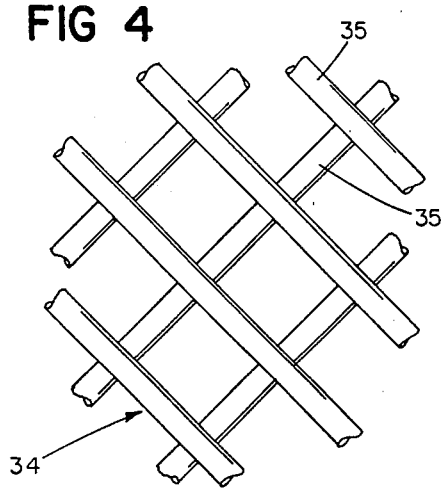
FIG. 4 is an enlarged perspective view of a portion of the support netting of FIG. 3.

Dialysis membrane 30, a Cuprophan (trademark of Enka Glanzstoff AG) cuprammonium cellophane sheet having a generally accordion pleated configuration and to which glycerin has been added as a plasticizer and humectant for smooth processing, is squeezed between fins 16, and is sealed with polyurethane potting 32 along its outermost flaps to the outer faces of the fins. The folded upper tips of membrane 30, shown somewhat rounded in FIG. 2, are affixed to casing 12 by being anchored in polyurethane potting 32, thereby forming a series of separate parallel fluid flow passages, indicated by B in FIG. 3, in the valleys above the membrane. Potting of the upper tips prevents shunting of fluid directly from inlet 18 to outlet 20 without entering passages B. Support netting 34, a nonwoven polypropylene mesh (see the arrangement of its strands 35 in FIG. 4) sold under the Du Pont trademark Vexar, is also in the form of an accordion pleated sheet, and is positioned within membrane 30 on the membrane side adjacent casing 14 (FIG. 3). By this configuration, support netting 34 spaces apart the underside faces of adjacent membrane walls with two layers of the netting shown in FIG. 4, and provides parallel fluid flow passages underneath the membrane, indicated by D in FIG. 3. Netting 34 is not bonded to either casing, except at its longitudinal ends, as will be described hereinafter, and unlike membrane 30 does not fold over fins 16.

Both membrane 30 and netting 34 are pleated along generally parallel lines, and strands 35 run at 45° to those lines.

Casing 12 has a continuous peripheral ridge 50 that seats in continuous peripheral groove 52 of shelf portion 54, which surrounds casing 14. When casing 12 and casing 14 are so interfitted, the tips of fins 16 are vertically spaced from the adjacent inner surface of casing 12 and from ribs 36 running transversely on that surface, to avoid cutting of membrane 30 between the pointed fin tip and casing 12.

Figure 5:
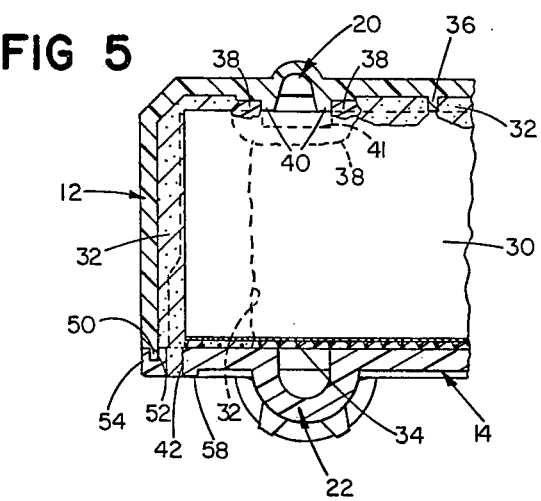
FIG. 5 is a sectional view along 5—5 of FIG. 1.

Longitudinal ends of membrane 30 and netting 34 are bonded to casings 12 and 14 by potting 32 (FIG. 5). Transverse ribs 36 (one shown in FIGS. 2 and 5) of casing 12 space the folded tips of membrane 30 from the casing ceiling to provide channels for flow of potting 32 during construction of dialyzer 10, described hereinafter. Ribs 36 have arcuate portions 56 which laterally space fins 16 from the angled and vertical sidewalls of casing 12 by tangential contact with fins 16 through membrane 30; portions 56 permit the flow channels to extend from the central fluid chamber between fins 16 to the side compartments between each fin and the corresponding sidewall of casing 12. A continuous ridge of General Electric RTV 108 thixotropic silicone rubber adhesive 38 adjacent casing ribs 40 surrounds the channel portion of outlet 20 (and in the same way inlet 18, though not shown) and bonds to the membrane tips, to act as a formed-in-place gasket in order to prevent flow of potting 32 into the channel area during construction. The adhesive needs to be thixotropic so that it will not itself wick across the membrane folds in the manifold area and thus block entrances to passages B. Inlet 18 and outlet 20 thus cooperate along their channel portions with membrane 30 to form inlet and outlet manifolds into and out of the fluid passages indicated at B in FIG. 3. Likewise inlet 22 and outlet 24 cooperate along their channel portions with membrane 30 on its underside to form inlet and outlet manifolds into and out of the fluid passages indicated at D in FIG. 3.

In constructing dialyzer 10, one pleats a sheet of membrane 30, pleats a sheet of netting 34, and combines the two by placing each fold of netting within a corresponding fold of membrane (FIG. 3). The resultant membrane-netting stack is squeezed together and placed in a casing 14 between fins 16, with each of the two outermost flaps of membrane 30 folded over its respective fin. Each outermost flap is then sealed to the outer face of the adjacent fin 16 with polyurethane potting 32. Casing 12 is then provided, and two ridges of silicone rubber adhesive 38, each having a weight of approximately one gram, are then applied around the outer edges of the channel portions of inlet 18 and outlet 20 of casing 12, adjacent ribs 40 and on end shoulders 41 (one shown in FIG. 5). Casing 14 is then interfitted with casing 12. Ridge 50 is wetted with solvent and then pressed into groove 52, to which it bonds on drying. A ramp portion 48 running along the base of each fin 16 serves to guide ridge 50 into groove 52. The interfitting is done while the silicone adhesive 38 is still wet so that it will seep a short way (about 1/16 to ¼ inch) into the membrane folds to prevent wicking of polyurethane potting in the folds in the manifold area and consequent undesirable blockage of fluid flow into or out of the folds. The membrane and netting longitudinal ends are then potted in polyurethane 32, which is applied through holes 42 in casing 14 at each end thereof by a needle inserted through tapes (not shown) placed on raised portions 58 and covering the holes 42 (only one hole is shown in FIG. 5). Dialyzer 10 is held vertical during this process, with the end to be potted at the bottom. After curing of the potting at the end, the dialyzer is rotated 180°, with the other end at the bottom, ready to receive its potting. Potting seeps into the netting side of the membrane but not generally into the other side (FIG. 5). Holes 42 are sealed with the hardened potting, and the tapes are removed.

The potting of the membrane tips and flaps to casing 12 now takes place. Dialyzer 10 is positioned horizontally with the membrane tips to be potted below the membrane body and horizontally aligned, with casing 12 on the bottom (inverted from FIG. 2). Plugs (not shown) are placed in inlet 22 and outlet 24, and a needle is inserted through one of the plugs to apply 300 mmHg positive pressure from a pressure source through netting 34 against the face of membrane 30 adjacent casing 14. The pressure source is removed after pressurization is complete, and a pressure gauge is used to check for leaks. The plug maintains the pressure. Inlet 18 and outlet 20 are open to atmospheric pressure. Approximately 60 cc of polyurethane potting 32, which comprises an initially liquid mixture of Polyol 936 and Vorite 689, a urethane prepolymer, both manufactured by N.L. Industries, Bayonne, New Jersey, is then pumped into a dialyzer 10 through hole 44 (FIG. 2) in one sidewall of casing 12. The potting flows into the side compartment formed between the sidewall of casing 12 and one fin 16 through channels between arcuate rib portions 56, down into the trough of casing 12, transversely through channels formed by 0.06 inch deep transverse ribs 36 (FIG. 5), and again through channels between arcuate portions 56 up into the other side compartment between the other sidewall of casing 12 and the other fin 16. Arcuate portions 56 prevent fins 16 from flaring outward to contact the sidewalls of casing 12 and thereby block potting flow into or out of the side compartments. A pair of pinholes (now shown) in casing 14, one adjacent inlet 22 and the other adjacent outlet 24, let air escape as the potting is pumped in. The potting settles uniformly on the inner surface of casing 12 and reaches the same level in each side compartment. Because of the positive pressure maintained on the opposite side of membrane 30, passages B are closed up, and the potting cannot wick or otherwise flow up between the folds. After a curing time of 60 minutes, one of the plugs is removed to permit a vacuum to be applied to the membrane side that initially received the higher pressure. Ten dialyzers 10 are connected in parallel to a vacuum pump through a 25 gauge one inch long needle acting as a pneumatic resistor, and the evacuation produces a negative pressure from 20 to 24 inches of mercury. The resistor chosen gives a desirable rate of evacuation. If evacuation is either too fast or too slow, unwanted bubbles will form in the polyurethane potting.

As a result of the evacuation, the folds of membrane 30 are drawn back from each other, enlarging the spaces between the folds, and are drawn tightly and even crushed against the folds of netting 34 (FIG. 6), which then support the membrane and prevent it from pulling away from the inner surface of casing 12. The now more viscous potting can seep up through the entrances to the spaces between the membrane folds and into those spaces to increase the bonding surface area provided by the membrane tips and thereby further improve the casing-membrane bond effected by the potting. However, the potting is too viscous to seep undesirably far into those spaces so as to interfere with flow passages B. Curing time between the pressure and evacuation steps is important; if the time chosen for the particular potting compound is too short, the potting will not be viscous enough and will seep too far into the spaces between the membrane folds when the vacuum is applied, thus interfering with fluid flow passages B. If the time is too long, unwanted bubbles will form in the potting because of its increased viscosity.

After further curing, dialyzer 10 is ready for use.

Dimensions of dialyzer 10 are as follows. Its housing is approximately 12 inches by 3⅜ inches by 2 inches. Membrane 30 has a dry thickness of 13.5 microns and an actual surface area of approximately 1.54 m². Netting 34 has 16 strands per inch and a mean thickness of 0.022 inch. Both membrane and netting have 66 folds ("folds" meaning adjacent pairs of membrane or netting walls joined along a crease), which is equivalent to the number of upper tips of membrane 30 affixed to casing 12 (far fewer folds are shown in the somewhat diagrammatic view of FIG. 2). There are 65 fluid flow passages B along the folds. The channel portions of inlet 18 and outlet 20 are approximately 2¾ inches long, ⅜ inch wide and 5/32 inch deep adjacent the tubular portion of the inlet or outlet, which acts as a port, and ⅜ inch wide and 1/16 inch deep at the narrower channel tip. There are seventeen ribs 36, spaced about ½ inch apart, and seventeen corresponding pairs of arcuate portions 56. Additionally, there is a pair of arcuate portions 56 (not shown) between each longitudinal end of casing 12 and inlet 18 and outlet 20.

2. Operation

When used as a hemodialyzer, dialyzer 10 operates as follows. Blood tubing is connected to inlet 18 and outlet 20, and dialysate tubing is connected to inlet 22 and outlet 24. Dialyzer 10 is mounted vertically, with inlet 18 and outlet 24 on top. Blood is introduced into inlet 18, flows along its channel portion, and then, partly because of the potting 32, flows into the spaces B between the folds of membrane 30 and in the general direction indicated by arrows in FIG. 3, until it is collected in the channel portion of outlet 20 and then passes out of dialyzer 10. Dialyzing fluid or dialysate is introduced into inlet 22 and flows along its channel portion where it is distributed into all of the dialysate flow passages D (FIG. 3), and flows in the general direction indicated by arrows in FIG. 3, countercurrently with blood flow. It has been found that the membrane tips adjacent casing 14 do not need to be potted to it, when dialysate is introduced on this side. Dialysate is collected in the channel portion of outlet 24 and then passes out of dialyzer 10, from which it is collected for regeneration or disposal. Dialysis occurs across membrane 30. Blood is introduced into its inlet port with use of a pump while dialysate is introduced into its inlet port at a lower pressure. Thus in addition to removal of unwanted substances from the blood by dialysis, dialyzer 10 effects removal of water from the blood through membrane 30 because of the pressure difference across the membrane.

In normal operation dialysate flows upward because of the vertical positioning of dialyzer 10, and the dialysate flow paths D (FIG. 3) are constantly being degassed as dialysate flows in that direction. The blood flow paths B (FIG. 3) are degassed prior to dialysis by inverting dialyzer 10, introducing a saline priming solution, and having that solution flow upward for a predetermined time.

Figure 6:
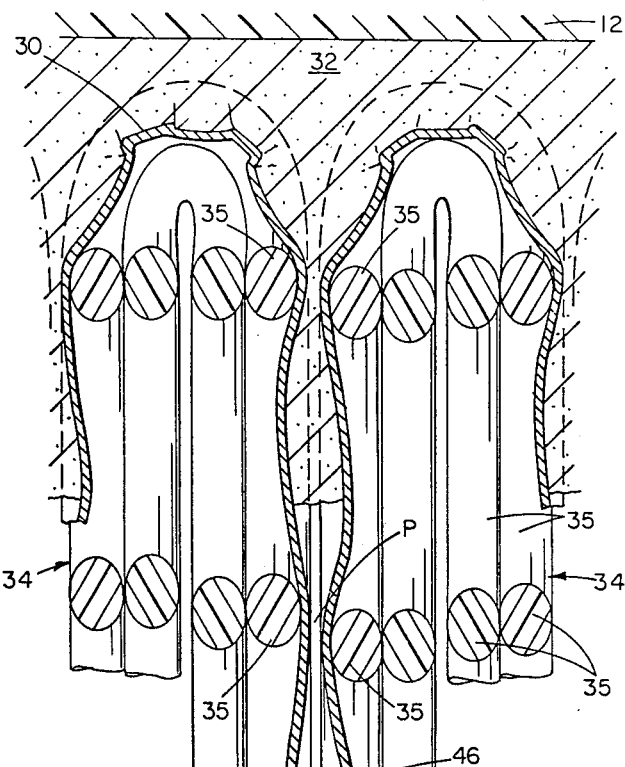
FIG. 6 is a greatly enlarged vertical sectional view like that of FIG. 2 of a portion of the membrane and support netting of the dialyzer of FIG. 1.

An enlarged view of the arrangement of support netting 34 and membrane 30 is shown in FIG. 6. Potting 32 has seeped somewhat into the space between the folds shown, to increase the bonding area and hence improve the bond between membrane tips and the potting. The pleated sheet configuration of netting 34 provides a spacer between adjacent membrane folds that is two layers thick. The effect is to increase the dialysate flow passages and to lower the dialysate pressure drop through the dialyzer. The double layer of netting tends not to entrap air bubbles, which on accumulating would impede dialysate flow and increase the pressure drop. Instead the bubbles desirably wash on through. As to blood flow, strands 35 tend to pinch adjacent folds of membrane 30 at spaced points designated P in FIG. 6. Between points P portions of folds of membrane 30 sag into inter-strand spaces of netting 34 to create separate blood flow passages 46. Pressure from the blood helps keep the membranes apart for blood flow.

Dialyzer 10 provides the following specifications and results when used in hemodialysis:

| Pressure Drops | |
|---|---|
| Blood (at flow rate, $Q_B$, of 200 ml/min. and Transmembrane Pressure (TMP) of 100 mmHg) (Hematocrit = 30%) | 15 mmHg |
| Dialysate (at flow rate, $Q_D$, 500 ml/min. and TMP of 100 mmHg) | 2 mmHg |
| In Vitro Clearances* | |
| ($Q_B$ = 200 ml/min. $Q_D$ = 500 ml/min. | TMP = 100 mmHg) |
| Urea | 140 ml/min. |
| Creatinine | 120 ml/min. |
| B-12 | 31 ml/min. |
| Ultrafiltration Rate (in vitro)* | 3.6 ml/hr/mmHg TMP |
| Blood Volume | |
| 100 mmHg TMP | 85 ml |
| 200 mmHg TMP | 120 ml |
| Dialysate Volume | 730 ml |
| Maximum TMP | 500 mmHg |

*Performance subject to variations in Cuprophan membrane.

Variations and Modifications

The invention has other uses beside that in hemodialysis; for example, it can be used in laboratory dialysis.

Regarding variations, I note that the curing time can be reduced or virtually eliminated by increasing the viscosity of the potting material when it is first pumped in so that it will be viscous enough for the evacuation step much sooner. Using an initially more viscous potting material will require greater pumping pressures (and, consequently, higher initial positive pressures on the dialysate side to keep the fold entrances closed) or larger flow channels in the casing.

A second variation is to paint an adhesive primer on the membrane tips and allow the primer to cure in order to bond adjacent tips to each other and thereby close the fold entrances. This can replace or supplement the use of positive pressure to close these entrances. With this variation no curing of the potting is necessary prior to the evacuation step because the entrances will not reopen as a result of evacuation and thus there will advantageously be no seepage of potting into the spaces between the membrane folds during evacuation. Rather, the membrane stack as a whole will be forced against the support netting and receive support therefrom. One chooses for the primer one that will improve the bond between the potting and the membrane.

A third variation is simply to substitute application of a positive pressure on the blood side of the membrane higher than that on the dialysate side for application of negative pressure on the dialysate side, to draw the membrane against the netting.

Other embodiments of the invention will be obvious to those skilled in the art.

Other Inventions

The method of injecting liquid potting material into a housing for uniform potting of the membrane tips to the housing was the invention of Thomas E. Goyne, and is the subject matter of U.S. Pat. No. 4,165,287, entitled "Potting Pleated Membrane".

The fin-membrane sealing construction was the invention of Donn D. Lobdell, and is the subject matter of U.S. Pat. No. 4,163,721, entitled "Edge Sealed Pleated Membrane".

The method of sealing off fluid inlets and outlets from seepage of potting thereinto was the joint invention of Dennis Hlavinka and Frank Corbin and is the subject matter of U.S. Pat. application Ser. No. 961,618.

What is claimed is:

1. In a method of bonding the tips of a pleated membrane to the interior of the housing of a fluid flow transfer apparatus containing said membrane, said method comprising the steps of:
    providing a housing for a fluid flow transfer apparatus and a pleated membrane having a plurality of folds,
        said folds having tips on the ends thereof, spaces including fluid flow passages therebetween, and entrances to said spaces,
    positioning spacers in the folds of said membrane on the membrane side opposite the side to be bonded,
    introducing between said membrane tips and said interior of said housing potting material in a flowable state, and
    curing said potting material to harden it,
    the improvement which comprises the steps of:
    maintaining said entrances to said spaces on the membrane side to be bonded closed throughout said introducing step, and
    applying a pressure differential across said membrane after said introducing step and while said potting material is still flowable, with the higher pressure being on the membrane side to be bonded,
        said pressure differential being large enough to force said membrane folds against their respective spacers so that said membrane conforms tightly around and is supported by said spacers, whereby forces tending to pull the membrane folds away from the potting material and in toward the spacers are resisted.

2. The method of claim 1 wherein said maintaining entrances closed step comprises applying a first pressure differential across said membrane with the higher pressure being on the side of said membrane opposite the side to be bonded to the interior of said housing and said pressure differential applied after said introducing step is a second pressure differential.

3. The method of claim 2 further including the step, done after introducing said potting material and before applying said second pressure differential, of partially curing said potting material for a time long enough to make said potting material more viscous but not long enough to render it unable to flow, while still maintaining said fold entrances closed.

4. The method of claim 3 wherein in said second pressure differential said pressure on the membrane side to be bonded is sufficiently higher than the pressure on the opposite side of the membrane to draw adjacent membrane folds away from each other, thereby reopening said entrances, to permit said potting material to flow partly into said spaces and wherein said partial curing step is long enough to make said potting material too viscous to flow far enough into said fluid flow passages to undesirably interfere with them when said entrances are reopened but not too long to prevent sufficient flow of said potting material into said spaces to increase the bonding surface of said membrane.

5. The method of claim 4 wherein said first pressure differential is achieved by applying positive pressure to the side of said membrane opposite the side to be bonded.

6. The method of claim 5 wherein said positive pressure is 300 mmHg.

7. The method of claim 3 wherein said partial curing step is done for 60 minutes.

8. The method of claim 3 wherein said first pressure differential is achieved by applying positive pressure to the side of said membrane opposite the side to be bonded.

9. The method of claim 8 wherein said positive pressure is 300 mmHg.

10. The method of claim 3 wherein said potting material is an adhesive.

11. The method of claim 2 wherein in said second pressure differential said pressure on the membrane side to be bonded is sufficiently higher than the pressure on the opposite side of the membrane to draw adjacent membrane folds away from each other, thereby reopening said entrances, to permit said potting material to flow partly into said spaces and wherein said potting material at the time of applying said second pressure differential is sufficiently flowable to flow partly into said spaces to increase the bonding surface of said membrane but is too viscous to flow far enough into said fluid flow passages to undesirably interfere with them.

12. The method of claim 11 wherein said first pressure differential is achieved by applying positive pressure to the side of said membrane opposite the side to be bonded.

13. The method of claim 12 wherein said positive pressure is 300 mmHg.

14. The method of claim 11 wherein said potting material is an adhesive.

15. The method of claim 2 wherein said positive pressure is 300 mmHg.

16. The method of claim 2 wherein said first pressure differential is achieved by applying positive pressure to the side of said membrane opposite the side to be bonded.

17. The method of claim 2 wherein said potting material is an adhesive.

18. The method of claim 1 wherein said maintaining entrances closed step comprises applying an adhesive primer to said membrane tips and curing said primer so that adjacent tips are bonded to each other, said primer improving the bond between said potting material and said membrane.

19. The method of claim 1 wherein said applying a pressure differential step comprises applying negative pressure to said membrane side opposite the side to be bonded.

20. The method of claim 19 wherein said negative pressure is from 20 to 24 inches of mercury.

21. The method of claim 20 wherein said negative pressure is applied through a 25 gauge one inch long needle to ten apparatus housing connected in parallel.

22. The method of claim 19 wherein said negative pressure is achieved by evacuating on the membrane side opposite the side to be bonded at a rate which avoids formation of unwanted bubbles in said potting material.

23. The method of claim 1 wherein said applying a pressure differential step comprises applying positive pressure to the membrane side to be bonded.

24. The method of claim 1 wherein said potting material is polyurethane.

25. The method of claim 1 wherein said potting material is an adhesive.

26. In a fluid flow transfer apparatus comprising a housing, a pleated membrane contained within said housing and having its tips on at least one side thereof bonded to the interior of said housing by potting material, and spacers positioned within the folds of said membrane opposite the membrane side to be bonded, the improvement wherein there is controlled penetration of potting material into spaces separating said folds on the side which is bonded and said membrane tips are crushed against and conformed to the shape of their respective said spacers so that during operation of the apparatus the tendency of the membrane tips to peel away from the potting material and in toward the spacers is resisted, thereby preventing formation of a fluid-shunting flow passage between the membrane tips and the potting material.

27. The apparatus of claim 26 wherein said potting penetrates into each of said spaces to generally the same degree.

28. The apparatus of claim 26 wherein said potting material is an adhesive.

* * * * *